(12) United States Patent
Vossenkaul et al.

(10) Patent No.: US 12,005,397 B2
(45) Date of Patent: *Jun. 11, 2024

(54) METHOD FOR INTRODUCING A GAS AND GAS INTRODUCING DEVICE

(71) Applicant: MEMBION GMBH, Roetgen (DE)

(72) Inventors: Klaus Vossenkaul, Aachen (DE); Dirk Volmering, Aachen (DE)

(73) Assignee: MEMBION GMBH, Roetgen (DE)

( * ) Notice: Subject to any disclaimer, the term of this patent is extended or adjusted under 35 U.S.C. 154(b) by 33 days.

This patent is subject to a terminal disclaimer.

(21) Appl. No.: 17/722,321

(22) Filed: Apr. 16, 2022

(65) Prior Publication Data
US 2022/0314172 A1  Oct. 6, 2022

Related U.S. Application Data (63) Continuation of application No. PCT/EP2020/080069, filed on Oct. 26, 2020.

(30) Foreign Application Priority Data

Oct. 28, 2019 (DE) .......................... 102019129074.0

(51) Int. Cl.
*B01D 65/02* (2006.01)
*B01D 63/06* (2006.01)

(52) U.S. Cl.
CPC ............. *B01D 65/02* (2013.01); *B01D 63/06* (2013.01); *B01D 2313/26* (2013.01); *B01D 2315/06* (2013.01); *B01D 2321/185* (2013.01)

(58) Field of Classification Search
CPC ........ B01D 63/02; B01D 63/04; B01D 65/02; B01D 2315/06; B01D 2321/185; B01D 63/06; B01D 2313/26; C02F 1/44; C02F 3/1273; C02F 3/208; C02F 2303/16
See application file for complete search history.

(56) References Cited

U.S. PATENT DOCUMENTS

| 2008/0017558 | A1 | 1/2008 | Pollock |
| 2009/0194477 | A1 | 8/2009 | Hashimoto |
| 2015/0265973 | A1* | 9/2015 | Phelps .................. B01D 65/02 |
| | | | 210/636 |

(Continued)

FOREIGN PATENT DOCUMENTS

| CN | 104084049 A | 10/2014 |
| CN | 104519984 B | 6/2016 |

(Continued)

*Primary Examiner* — Patrick Orme
(74) *Attorney, Agent, or Firm* — Von Rohrscheldt Patents (57) ABSTRACT

A method for introducing a gas into a liquid, the method including filling a gas volume enclosed below a free surface of the liquid and defined in a downward direction by an enclosed level of the liquid with the gas in sequential pulses wherein the gas simultaneously displaces the liquid top down from a gas lifting channel until the enclosed level of the liquid drops below an inlet cross section of a gas flow out channel; subsequently flowing the gas out of the gas volume downward through the gas lifting channel, a deflection portion adjoining at a bottom of the gas lifting channel, in upward direction through the inlet cross section and through the gas flow out channel adjoining the inlet cross section at a top to the free surface.

12 Claims, 10 Drawing Sheets

(56) References Cited

U.S. PATENT DOCUMENTS

2016/0114292 A1* 4/2016 Colby .................... B01D 65/08
                                                            210/151

FOREIGN PATENT DOCUMENTS

| CN | 105854619 A | 8/2016 |
| KR | 20190002119 A | 1/2019 |
| WO | WO2008153818 A1 | 12/2008 |
| WO | WO2011028341 A1 | 4/2016 |
| WO | WO2016064466 A1 | 4/2016 |

* cited by examiner

METHOD FOR INTRODUCING A GAS AND GAS INTRODUCING DEVICE

RELATED APPLICATIONS

This application is a continuation of International patent application PCT/EP2020/080069 filed on Oct. 26, 2020 claiming priority from German patent application DE 10 2019 129 074.0 filed on Oct. 28, 2019, both of which are incorporated in their entirety by this reference.

FIELD OF THE INVENTION

The invention relates to a method for introducing a gas into and to a gas introduction device capable of performing the method.

BACKGROUND OF THE INVENTION

A generic method and a generic gas introduction device are known from US 2015/0265973 A1, CN 104084049A and CN 105854619 A.

The known methods and the known gas introduction devices are configured for introducing gas into membrane filters that can be found e.g. in membrane bioreactors (MBR). The gas introduction device is positioned below the membrane filters and supplied with an essentially constant air volume flow which then flows out of the gas introduction device in pulses.

In order to prevent a plugging of the membranes by filtered substances, air is introduced from below into the membrane filters. On a path towards the surface of the liquid, the gas flows through the membrane filters installed on top of the gas introduction device. The shear force thus generated by the two-phase flow made from air and liquid to be filtered flushes the membranes.

The pulsed exit of the liquid generates higher shear forces than continuous gas introduction while simultaneously preventing a channeling of the air, this means the rising air bubbles always have to be formed anew and thus always find new paths through the membrane filter.

A gas introduction device that is constantly supplied with air and that lets out the air in pulses is also designated as a geyser.

A gas volume that is built up in the gas collection cavity is pulled through the gas lifting channel connected to the inlet cross section when gas flows out of the gas introduction device through the principle of communicating pipes so that the gas collection cavity is substantially emptied.

During emptying of the gas collection cavity, the outflowing gas volume flow suctions liquid through the compensation inlet and transports the liquid through the outflow channel using an air lift pump effect. This has the advantage that the gas volume flow subsides more quickly after emptying the gas collection cavity so that the gas introduction device can be operated with a higher gas flow.

The configuration of the compensation inlet of the known gas introduction device has the disadvantage that the emptying process of the gas collection cavity does not start at low gas feed volume flows as they are required e.g. for low filtration performance of the membrane filters in order to save energy since no sufficient suction effect can be developed any more due to the open connection to the liquid wherein the suction effect would evacuate the gas collection cavity. In this case the small amount of air flows without pulsing through the gas outflow channel so that the cleaning power of the introduced air is significantly reduced.

In the known gas introduction device, a compromise has to be found in the sizing of the compensation inlet. This compromise, however, has the consequence that the portion of the air volume flow introduction is limited. When the gas volume flow is too small the emptying of the gas collection cavity does not start and when the gas volume flow is too great the exiting gas volume flow does not stop. In both cases this means that the geyser stops pulsing which significantly reduces the flushing effect for the membranes.

According to the known method, the compensation inlet is in liquid communication during any point of operations so that the variation of the gas volume flow feed is limited due the described effects.

Thus, membrane bioreactors in particular in the field of municipal biological waste treatment plants are often operated with highly variable through put which can be subject to large variations depending on water in feed to the waste treatment plant during rainy periods or dry periods. Thus, it appreciated that an essential economic aspect of operating membrane bioreactors is their energy requirement for supplying air to the membrane modules. As a matter of principle, the requirement of flushing air for the membrane modules is a function of their through put, since also the volume of solids retained by the membranes and thus the flushing requirement of the membrane filters increases with increasing through put.

From an energetic and thus also economic point of view, it is desirable to be able to variably adapt the volume of flushing air introduced to the throughput of the membrane filters.

This shows a limit of the known gas introduction device since this device can only be operated in a limited variation range of the fed gas volume flow so that it pulses in a stable manner.

Generic gas introduction devices are described in WO 2016/064466 A (Koch Membrane Systems), US 2009/0194477 A1 (Asahi Kasai), U.S. Pat. No. 10,179,311 B2 (Sumitomo Electric), CN 10451998B (Samsung Cheil Industries), KR 20190002717 A (Mitsubishi Chemical) and WO 2011/028341 A1 (Zenon Technology Partnership) which do not include a compensation inlet and can therefore only be operated with a rather small gas volume feed in a pulsating manner.

BRIEF SUMMARY OF THE INVENTION

Thus, it is an object of the invention to propose a gas introduction device which pulsates in a stable manner in a wide variation range of the gas volume flow feed.

The object is achieved by A method for introducing a gas into a liquid, the method including filling a gas volume enclosed below a free surface of the liquid and defined in a downward direction by an enclosed level of the liquid with the gas in sequential pulses wherein the gas simultaneously displaces the liquid top down from a gas lifting channel until the enclosed level of the liquid drops below an inlet cross section of a gas flow out channel; subsequently flowing the gas out of the gas volume downward through the gas lifting channel, a deflection portion adjoining at a bottom of the gas lifting channel, in upward direction through the inlet cross section and through the gas flow out channel adjoining the inlet cross section at a top to the free surface, wherein a blocking flow of the liquid flows through a compensation inlet arranged below a gas lifting channel inlet to the inlet cross section and is pulled along by the gas until the liquid fills the deflection portion and thereby closes the inlet cross section; initially only flowing the gas through the gas outlet channel after the enclosed level of the liquid has dropped below the inlet cross section until the enclosed level of the liquid rises above the compensation inlet, and only thereafter running the blocking flow through the compensation inlet to the inlet cross section.

Improving upon the known method it is proposed according to the invention that gas only flows through the gas outlet channel after the level has dropped below the inlet cross section, initially only the gas flows through the gas outlet channel until the level rises above the compensation inlet and only then the blocking flow runs through the compensation inlet to the inlet cross section.

This means according to the method according to the invention at the beginning of the gas flow through the gas outlet channel, the compensation channel is in gas communication, this means it is in the gas filled collection cavity. This assures that the emptying of the gas volume starts reliably even at extremely low gas volume flows, since no liquid flow limits the gas suction effect and thus the lifting and emptying of the gas volume.

According to the method according to the invention the level in gas introduction device rises again during the emptying of the gas volume, wherein the gas volume is displaced by the liquid flowing in from below. Thus, the level rises at some point in time above the compensation inlet and brings the compensation inlet into liquid communication. From this moment the suction effect of the gas rising in the outlet channel causes a blocking flow of the liquid to be pulled through the compensation inlet and to flow to the inlet cross section. This blocking flow of the liquid is pulled along by the gas until the liquid fills the deflection portion and thus fills the inlet cross section and thus closes like a valve for the gas.

Thus, the method according to the invention assures that the flow out of the gas is interrupted at one point in time when the gas volume is substantially pulled empty even at a high gas volume feed and the gas volume can be filled up again. Thus, the pulsating of the gas is also assured at a high gas volume flow feed.

The method according to the invention is advantageously used in a process for filtering a liquid in a membrane filter that is submerged into the liquid and includes membranes wherein gas is introduced from below into the membrane filter in order to clean the membranes and flows through the flow out channel according to the method according to the invention and is then introduced to the membrane filter.

Thus, the method according to the invention has the advantage that the substantially constant gas volumes flow feed is variable in a wide range and is then introduced into the membrane filter stable pulsing. Thus, the pulsating gas volume flow through the membrane filter can be adapted to the respective filtration performance over a wide range of the filtration performance variations.

The combination of the gas introduction device according to the invention with a membrane filter arranged there above has the advantage that the membrane filter can also be reliably operated in a pulsating manner with variable filtration power and with variable gas volume flow so that an effective flushing of the membranes can be implemented at low energy consumption.

Improving upon the known gas introduction device it is proposed according to the invention that the compensation inlet is at a level of the inlet cross section or there above.

The compensation inlet is therefore below the upper wall and above or at the same level of the inlet cross section. Thus, the compensation inlet is in gas communication when the gas collection cavity is filled with gas and in fluid communication when the gas collection cavity is emptied. This has the advantages described supra for the start and stop process of the geyser process providing pulsating emptying and refilling of the gas collection cavity.

In a simple configuration of the gas introduction device according to the invention the compensation inlet leads into the gas lifting channel. Since the liquid is introduced in this case directly into the high downward flowing gas volume flow in the gas lifting channel the pull along effect through the gas is comparatively high which limits the increase of the gas volume flow feed. This effect can be counteracted by increasing the compensation inlet which, however, leads to a restriction of the gas volume flow in downward direction so that the gas volume above the compensation inlet is not evacuated.

In another embodiment of the gas introduction device according to the invention a compensation channel joins the compensation inlet in a direction towards the deflection portion. The compensation channel decouples the position of the compensation inlet and the location of the introduction of the liquid blocking flow into the exiting gas flow which leads to an expansion of the variation of the gas volume feed.

In an advantageous embodiment of this gas introduction device the compensation channel leads into the deflection portion parallel to the gas lifting channel. Thus, the location of introducing the blocking liquid flow is moved downward as far as possible. This has the advantage that the liquid is conducted separately from the gas volume flow exactly to the location where the liquid is to generate the blocking effect for the gas which facilitates a stop of the gas outflow also at a higher gas volume flow feed.

The gas volume flow feed can be increased even further while reliably maintaining the pulsation through an alternative configuration of the gas introduction device according to the invention wherein a cross section of the compensation inlet is greater than a minimal cross section of the compensation channel for a parallel connection of the compensation channel for the gas lifting channel with the deflection portion. This increases blocking flow of the liquid and provides quicker and more reliable closing of the inlet cross section for the gas also at a higher gas volume flow feed.

The invention furthermore relates to a membrane filter with membranes and a gas introduction device arranged below the membranes that is configured according to the features according to the invention.

The membrane filter can thus be configured with various types of membranes like e.g. hollow fiber membranes, plate membranes, cushion membranes or hollow fiber membranes connected into curtains. The membranes are advantageously from the genus of ultra or micro filtration membranes with a pore size between 0.02 µm and 1 µm. However also other membranes or low pressure reverse osmosis.

In another embodiment of the membrane filter with a gas introduction device according to the invention installed thereunder the membrane filter includes a housing that laterally envelopes the membranes and that joins the gas introduction device from above, wherein the gas introduction device includes a liquid flow channel that penetrates the gas collection cavity vertically in order to let the fluid run into the membrane filter from below.

It is an advantage of this configuration of the membrane filter with the gas introduction device according to the invention that gas introduced into the membrane filter cannot exit the membrane filter due to the housing that laterally envelopes the membranes and the gas is thus efficiently used for flushing the membranes. Since the liquid volume within the membrane filter also has to be replaced during flushing of the membranes with the gas in order to prevent a concentration of substances in the membrane filter that are retained by the membranes the gas introduction device includes a liquid flow channel that vertically penetrates the gas collection cavity for introducing liquid at a bottom into the membrane filter.

In an advantageous embodiment of the gas introduction device according to the invention in combination with a membrane filter installed there above the housing of the membrane filter is configured as a pipe. A pipe of this type can have a circular, rectangular or any cross section. An advantage of this pipe is cost effective production e.g., by extrusion.

In order to distribute air introduced from the gas introduction device into the membrane filter an embodiment of the gas introduction device according to the invention in combination with a membrane filter installed there above includes a gas distributor below the membranes wherein the flow out channel leads into the gas distributor.

Thus, it is a feature of the gas introduction device according to the invention that the flow channels are partially or completely formed by walls of a housing of the gas introduction device. Among these flow channels are the outflow channel, the gas lifting channel, the compensation channel and the deflection portion.

When configuring the gas introduction device according to the invention the gas inlet can be configured differently. In a first embodiment the gas inlet is mounted as a separate portion of the gas introduction device below the gas collection cavity. In another embodiment the gas inlet penetrates the upper wall or the lateral wall of the gas collection cavity and leads into the gas collection cavity as a portion of the gas introduction device that is connected with the wall. The gas introduction device according to the invention can also be alternatively used for pulsing gas introduction into other liquids.

BRIEF DESCRIPTION OF THE DRAWINGS

The invention is subsequently described in more detail based on an advantageous embodiments with reference to drawing figures, wherein.

DETAILED DESCRIPTION OF THE INVENTION

The drawing figures are not to scale. All details of the subsequently described methods or gas introduction devices are identical with the embodiments of the gas introduction devices according to the invention described supra.

Figures 1A, 1B:
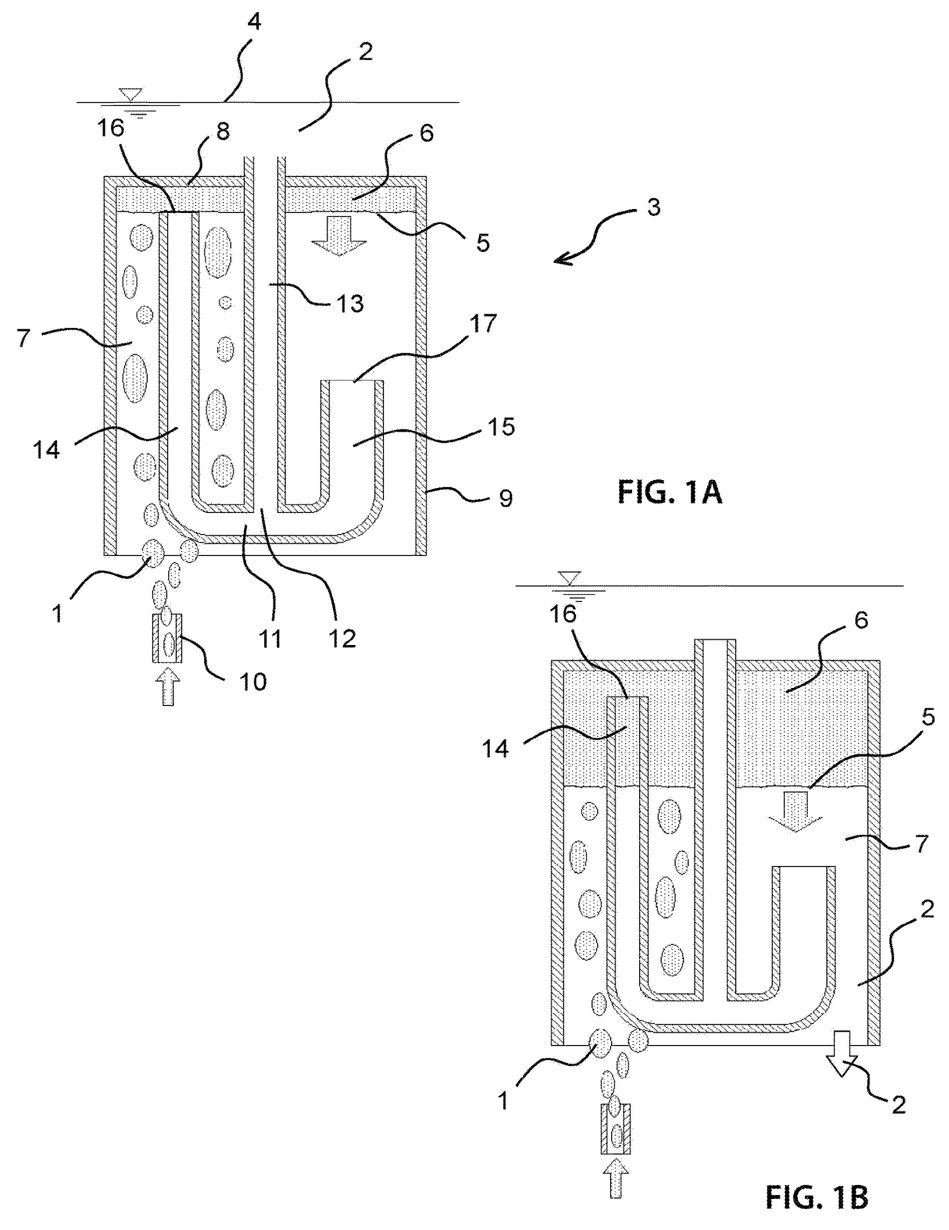
FIGS. 1a-i illustrate process steps of a first method according to the invention in a first gas introduction device according to the invention in sectional views.

FIG. 1a shows the process steps of a first method according to the invention for introducing a gas 1 into a liquid 2 using a first gas introduction device 3 according to the invention illustrated sectional views.

The gas introduction device 3 includes a gas volume 6 that is arranged below a surface 4 of the liquid 2 and defined in downward direction by a level 5 of the liquid 2. The gas volume 6 is arranged in a gas collection cavity 7 that is defined by an upper wall 8 and a side wall 9. Through a gas inlet 10 installed below the gas collection cavity 7 and separate from the gas collection cavity 7 gas 1 is introduced into the gas collection cavity 7 and thus fills the gas volume 6 so that the level 5 of the liquid 2 goes down. Thus, the liquid 2 that is in the gas collection cavity 7 is displaced at this point in time successively by inflowing gas 1 in downward direction and replaced by the gas 1.

The gas introduction device according to the invention includes a deflection portion 11 which includes an inlet cross section 12 on top wherein a gas outflow channel 13 joins the inlet cross section on top. A gas lifting channel 14 and a compensation channel 15 lead into the deflection portion 11. The gas lifting channel 14 includes an open gas lifting inlet 16 in a top of the gas collection cavity 7 and the compensation channel 15 includes a compensation inlet 17 below the upper wall 8 in the gas collection cavity 7, wherein the cross section of the compensation inlet 17 is sized larger than the minimum cross section of the compensation channel 15. Furthermore, the gas outlet channel 13 penetrates the upper wall 8.

Figure 1C:
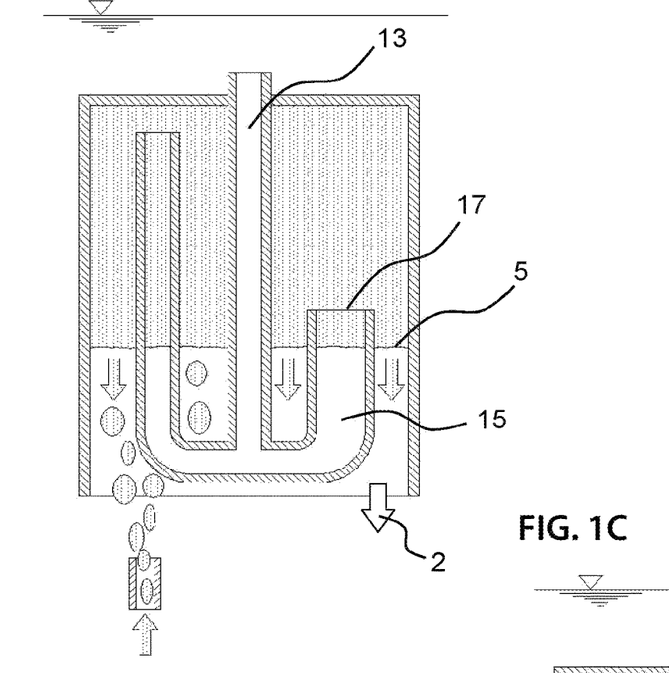
Figure 1D:
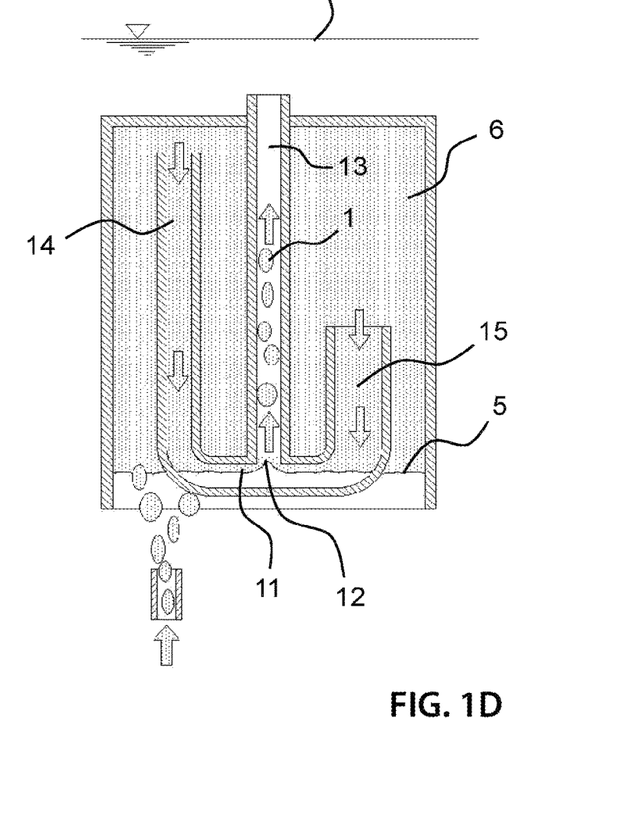

FIGS. 1b-1d show additional filling of the gas collection cavity 7 with the gas 1 and thus an additional filling of the gas volume 6 and an additional lowering of the level 5 of the liquid 2. As illustrated in FIG. 1b, gas 1 moves from above through the gas lifting inlet 16 into the gas lifting channel 14 when filling the gas volume 6 so that the gas lifting channel 14 is filled with the gas 1 top down.

In FIG. 1c the level 5 has dropped below the compensation inlet 17 and gas 1 moves from above into the compensation channel 15. During the method steps shown in FIGS. 1a-1c, the gas flow out channel 13 remains filled with fluid 2, this means no gas flows out of the gas introduction device 3.

In FIG. 1d, the level 5 of the liquid 2 has dropped below the inlet cross section 12. From this moment the gas 1 flows out of the gas volume 6 through the gas lifting channel 14 and the compensation channel 15 in downward direction to the deflection portion 11 and thereafter through the inlet cross section 12 and the subsequent gas flow out channel 13 to the surface 4.

Figures 1E, 1F:
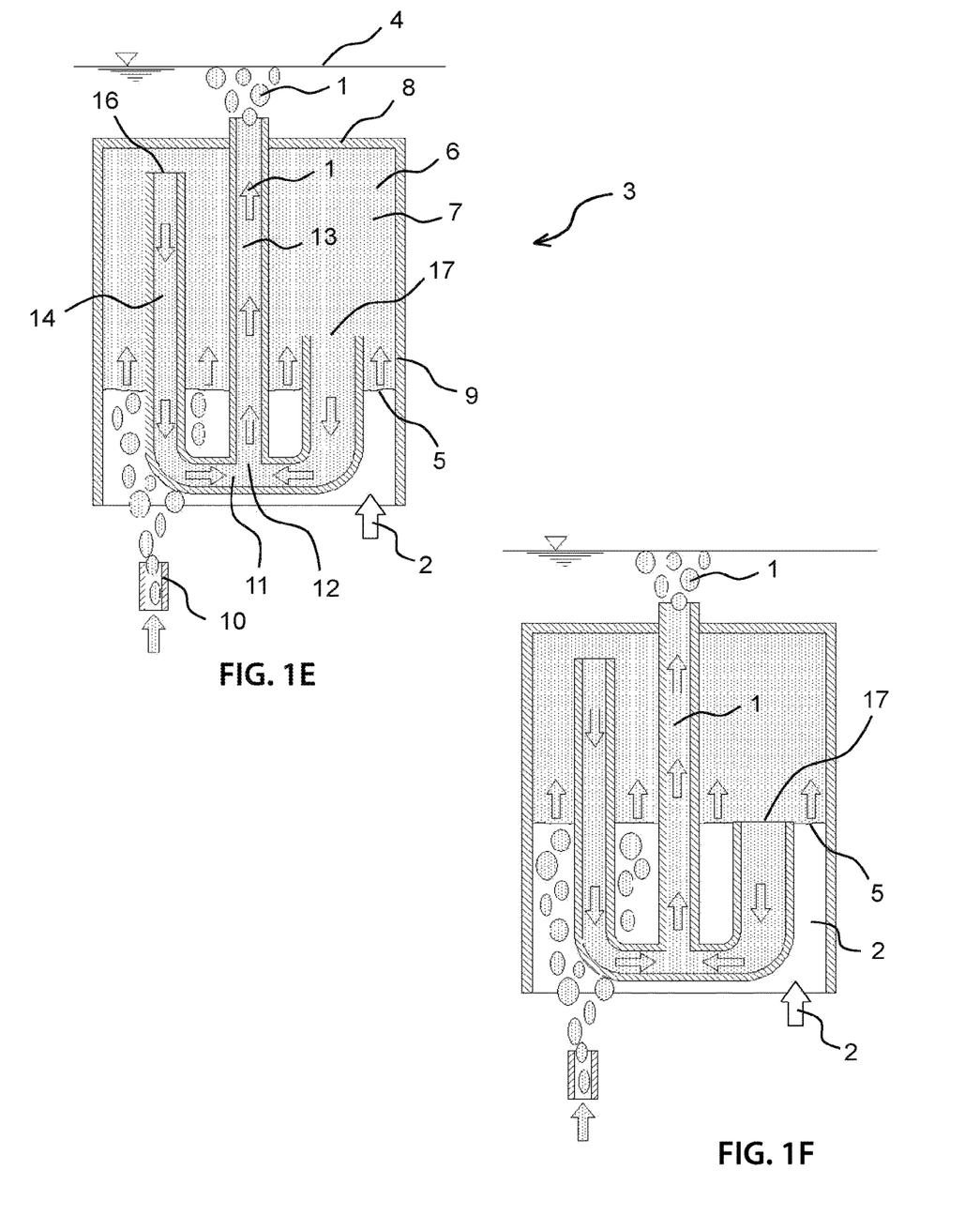

FIG. 1e shows how the gas volume 6 in the gas collection cavity 7 is reduced by the outflowing gas 1. Thus, gas 1 flowing out of the gas collection cavity 7 is successively replaced by liquid 2 that flows in from below so that the level 5 of the liquid 2 rises again.

The gas 1 flowing out through the gas flow out channel 13 generates a vacuum in the gas flow out channel 13 and in the adjoining gas lifting channel 14 and in the compensation channel 15. Since the gas lifting inlet 16 as well as the compensation inlet 17 are arranged at this point in time in the gas volume 6 filled with the gas 1 in the gas collection cavity 7, initially only the gas 1 flows through the gas outlet channel 13 induced by the suction created.

FIG. 1f shows the moment in time when the level 5 of the liquid 2 reaches the compensation inlet 17. Up to this point in time, only gas 1 has flowed through the gas outlet channel 13.

Figure 1G:
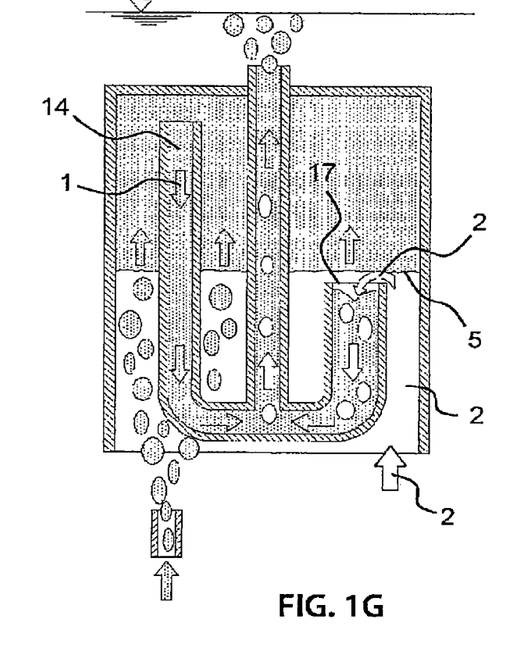

FIG. 1g shows how the compensation inlet 17 is flooded with fluid 2 during a further increase of the level 5 due to the gas flowing out through the gas lifting channel 14.

Figure 1H:
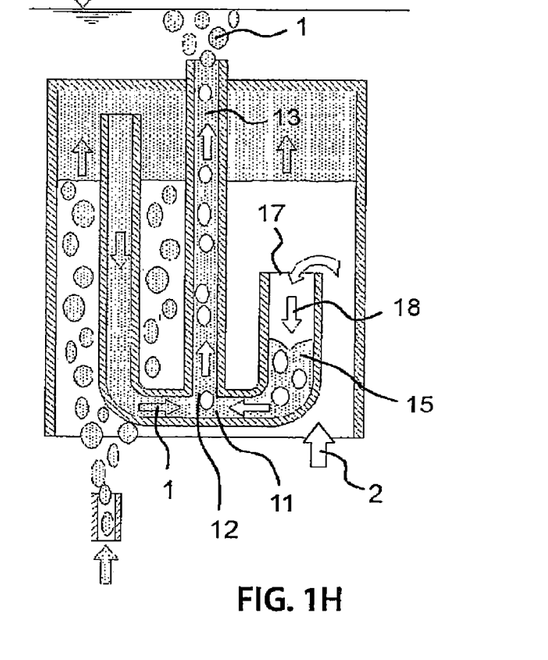
Figure 1I:
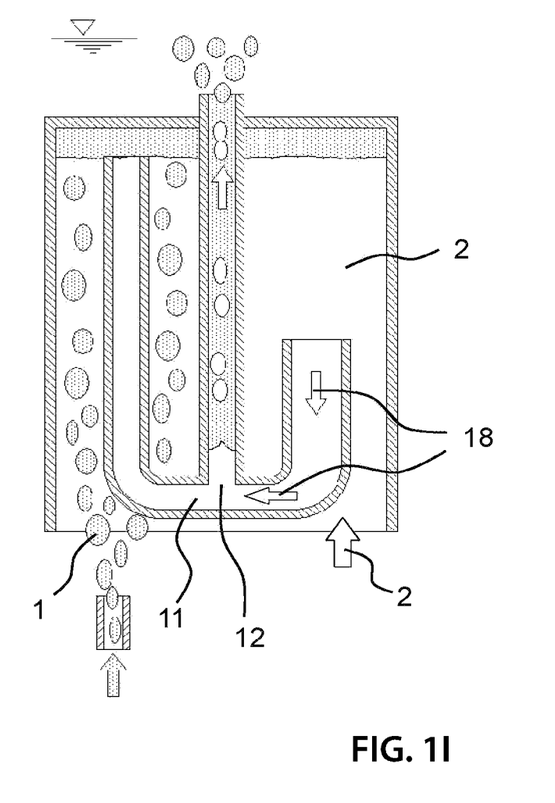

FIG. 1h shows how a blocking flow 18 of the liquid 2 is pulled through the compensation inlet 17 through the suction effect of the gas 1 flowing out of the gas flow out channel 13 so that the blocking flow 18 of the liquid 2 flows through the compensation channel 15 to the inlet cross section 12 and is pulled along by the outflowing gas 1 until the blocking flow 18 of the liquid 2 fills the deflection portion 11 in FIG. 1i and closes the inlet cross section 12 for the gas 1 like a valve.

Figure 2:
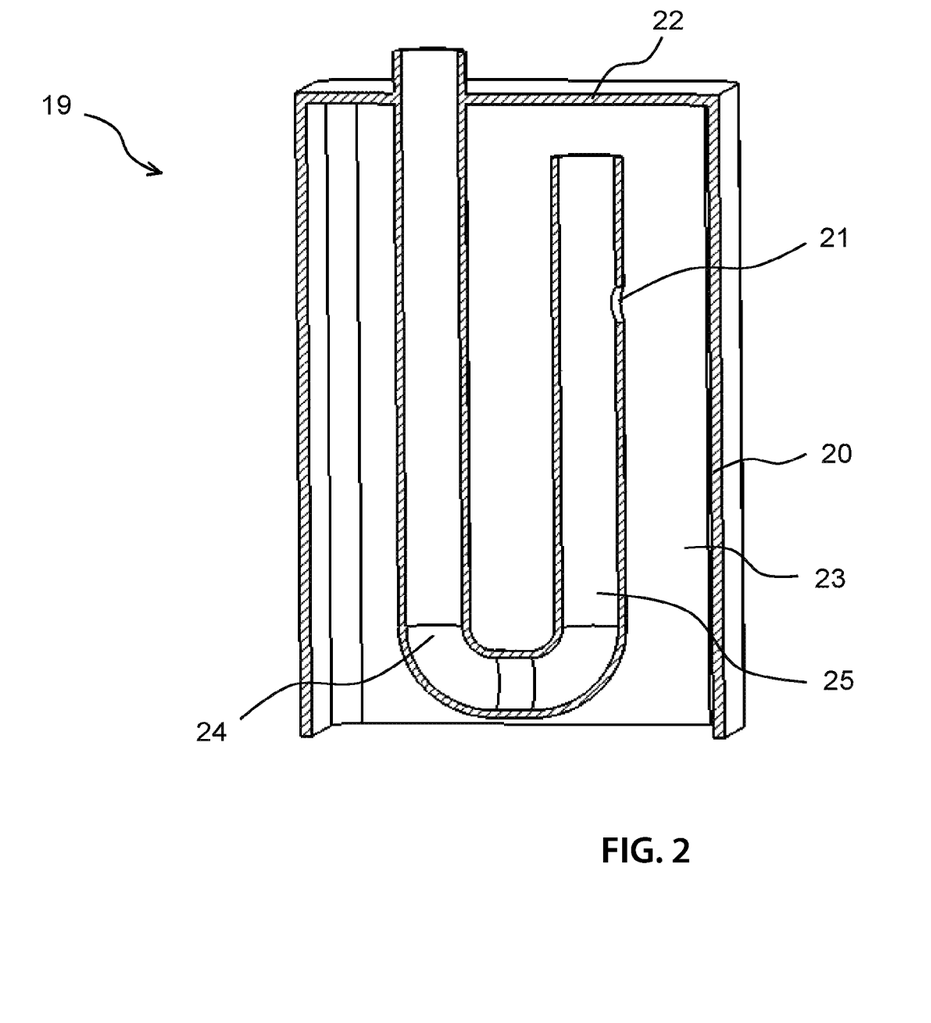
FIGS. 2-6 illustrate sectional views of other gas introduction devices according to the invention.

FIG. 2 illustrates another gas introduction device 19 according to the invention with a lateral wall 20 that is configured as a rectangular channel with a side length of 12 cm. Also, here there is a compensation inlet 21 that is positioned approximately 6 cm below an upper wall 22 in a gas collection cavity 23 and that is also arranged above an inlet cross section 24. In this case the compensation inlet 21, leads directly into a gas lifting channel 25.

Figure 3A:
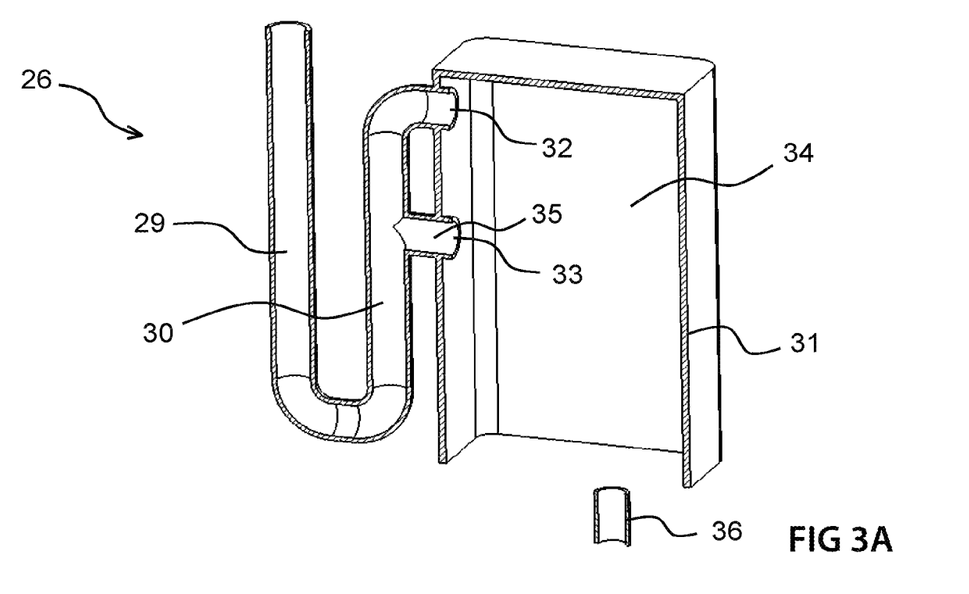
Figure 3B:
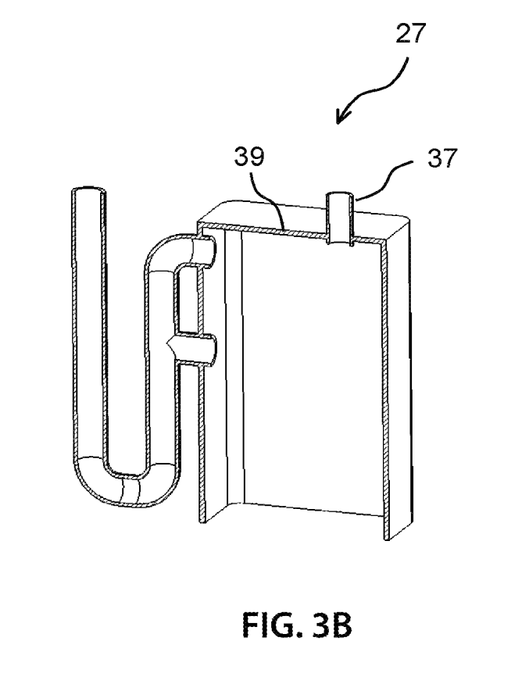
Figure 3C:
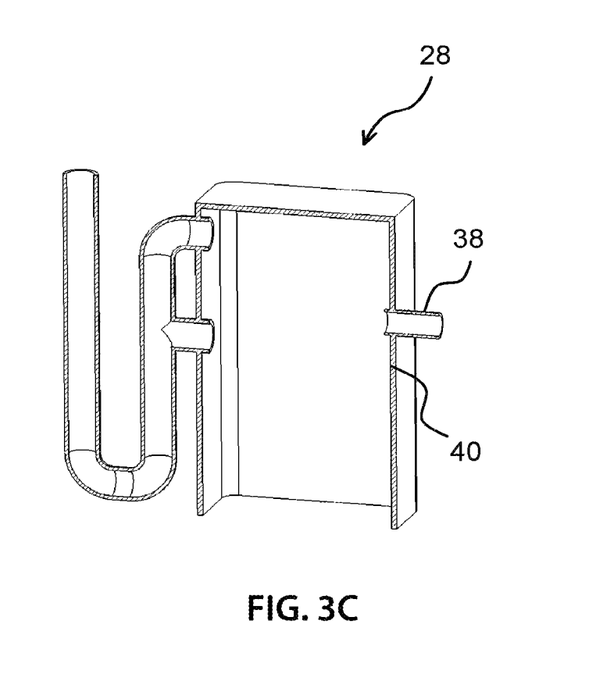

FIGS. 3a-3c show three gas introduction devices 26, 27, 28 that are identical in most parts. In this case a flow out channel 29 as well as a gas lifting channel 30 are substantially arranged outside of a lateral wall 31, wherein a gas lifting inlet 32 and a compensation inlet 33 lead into a gas collection cavity 34 within the side wall 31 according to the invention. Furthermore, a compensation channel 35 adjoins the compensation inlet 33 wherein the compensation channel leads into the gas lifting channel 30. In this case, the gas lifting channel 30 and the compensation channel 35 penetrate the side wall 31.

The variants 3a through 3c differ only in the positioning the gas inlet 36, 37, and 38. In the variant 3a the gas inlet 36 is separately positioned below the gas collection cavity 34 like in the first gas introduction device 3. In the variant 3b, the gas inlet 37 penetrates an upper wall 39 and in the variant 3c the gas inlet 38 penetrates a side wall 40. The different illustrated positions of the gas inlet 36, 37, 38 are possible in principle in all gas introduction devices according to the invention and are therefore not illustrated in detail in some drawing figures.

Figure 4:
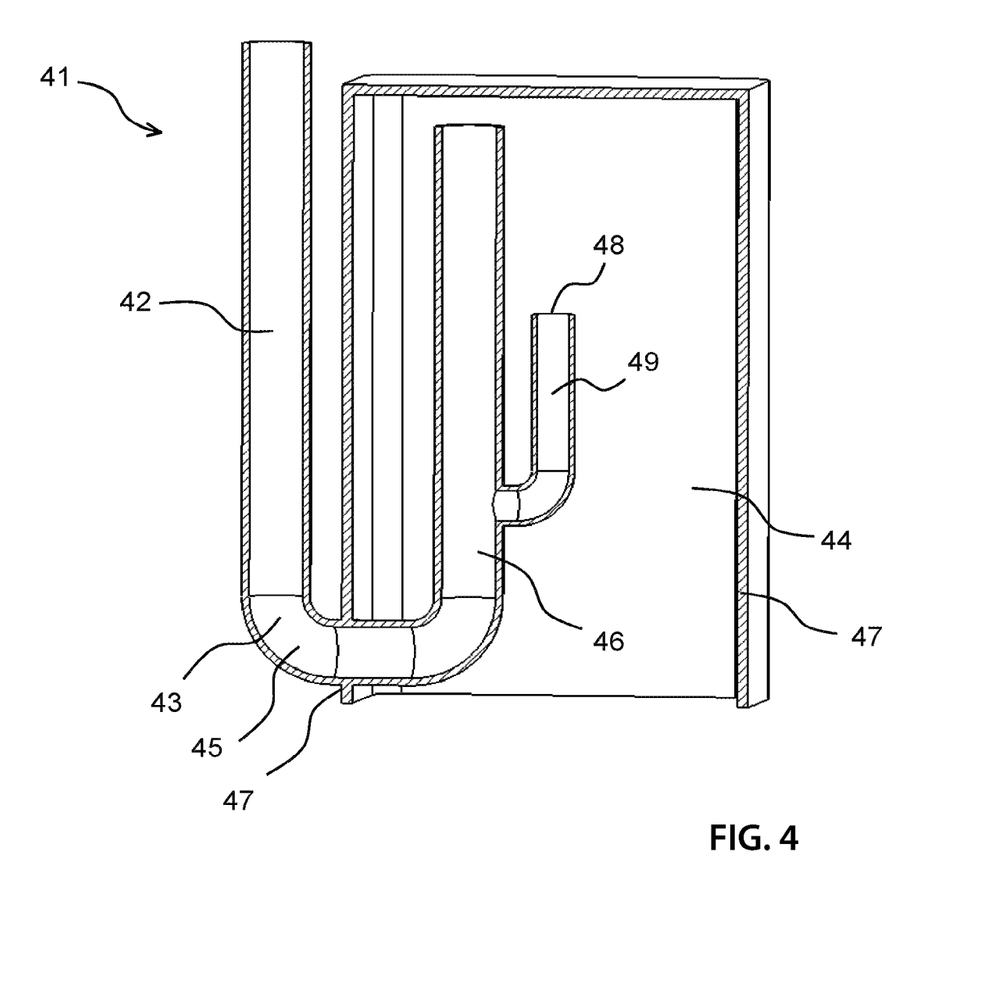

FIG. 4 illustrates another gas introduction device 41 according to the invention where a flow out channel 42 and an inlet cross section 43 are positioned entirely outside of a gas collection cavity 44, wherein a gas lifting channel 46 that adjoins a deflection portion 45 from below is arranged within the gas collection cavity 44 that thus penetrates a side wall 47.

Also, in the gas introduction device 41 according to the invention a compensation channel 49 adjoins a compensation inlet 48 wherein the compensation channel 49 leads into the gas lifting channel 46 and is therefore flowable up to the inlet cross section 43.
in this case the compensation channel 49 extends vertically and leads into the gas lifting channel 46 further below.

Figure 5:
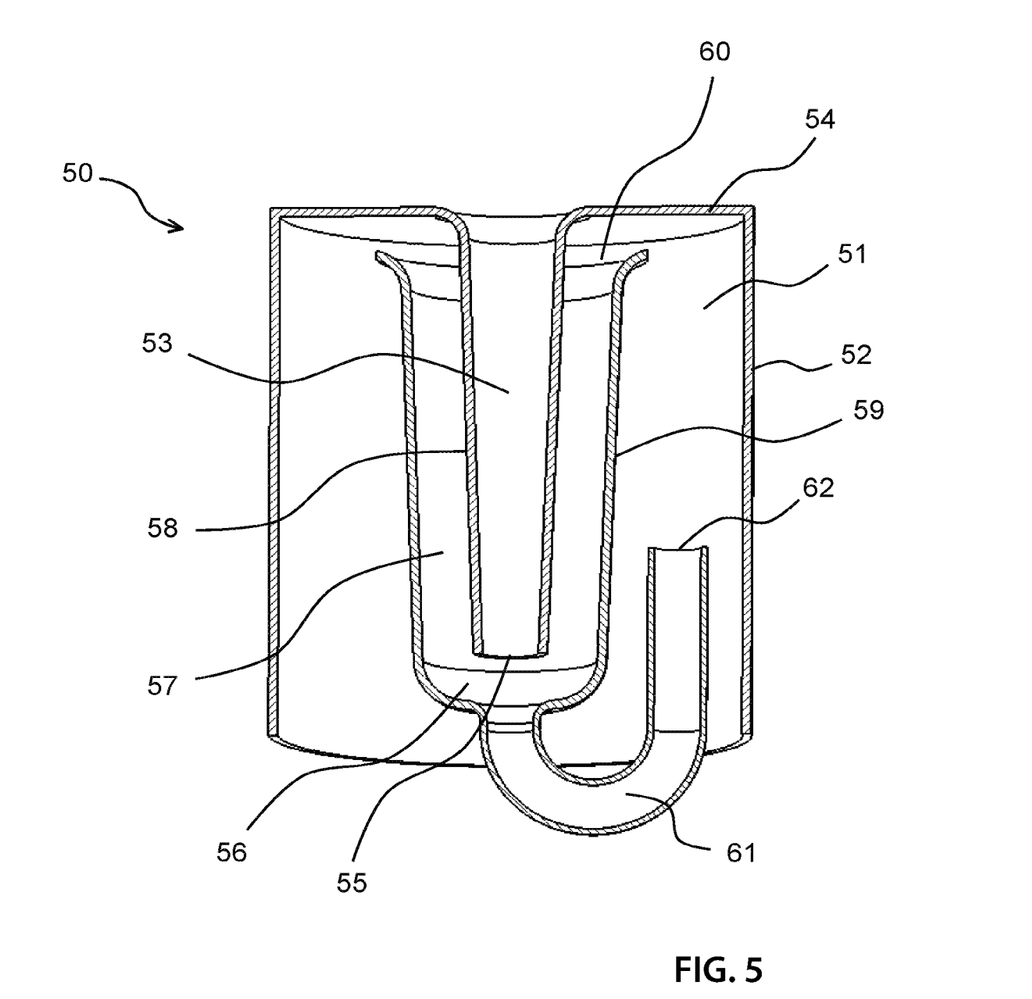

FIG. 5 shows another gas introduction device 50 according to the invention in a sectional view. Herein a gas collection cavity 51 is defined by a circular tubular side wall 52 with a diameter of approximately 17 cm in which a gas outflow channel 53 is centrally located which penetrates an upper wall 54. The gas flow out channel 53 includes an inlet cross section at a bottom adjoined by a deflection portion 56 at a bottom. A gas lifting channel 57 leads into the deflection portion from above wherein the gas lifting channel is configured in this case as an annular gap between an outer wall 58 of the gas outflow channel 53 and a bell 59 placed from below over the gas outflow channel 53. The gas lifting channel 57 includes an annular open gas lifting inlet 60 on top. A compensation channel 61 adjoins the deflection portion 56 at a bottom of the bell 59 wherein the compensation inlet 62 of the compensation channel 61 leads into the gas collection cavity 51.

The gas outflow channel 53 includes an inlet cross section 55 at a bottom wherein a deflection portion 56 adjoins the inlet cross section 55.

Figure 6:
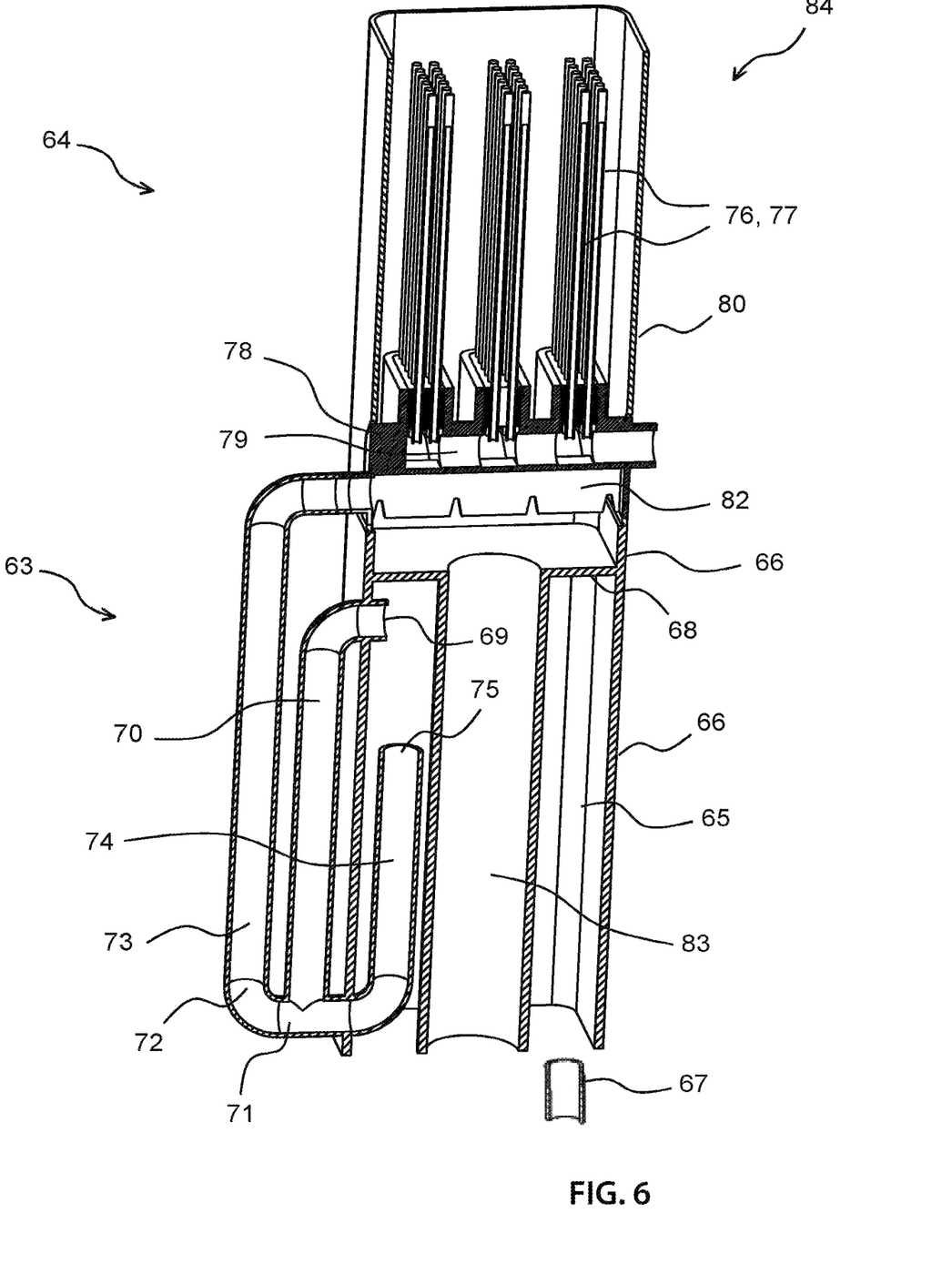

FIG. 6 shows a sectional view of another gas introduction device 63 according to the invention which is mounted below a membrane filter 64. The gas introduction device 63 has a gas collection cavity 65 that is laterally defined by a lateral wall 66 configured as a rectangular tube with 20 cm lateral width. The gas collection cavity 65 is open in a downward direction with a gas inlet 67 arranged there under and configured to fill the gas collection cavity 65 with a gas during operations. A gas lifting inlet 69 leads into the gas collection cavity 65 on top below an upper wall 68 wherein a gas lifting channel 70 adjoins the gas lifting inlet 69. The gas lifting channel 70 leads at a bottom into a deflection portion 71 which is adjoined by an inlet cross section 82 on top. The deflection portion 71 runs through a lateral wall 66 at a bottom. A gas outlet channel 73 is connected to the inlet cross section 72 on top. Additionally, the gas introduction device 63 includes a compensation channel 74 that is arranged within the side wall 66. The compensation channel 74 includes a compensation inlet 75 at a top of the gas collection cavity 65 and leads into the deflection portion 71 at a bottom.

The membrane filter 64 includes membranes 76 configured as hollow fiber membranes 77 which are cast into a base element 78 at a bottom. The base element 78 includes a permeate collection cavity 79 wherein the hollow fiber membranes 77 are connected with an open lumen side to the permeate collection cavity in order to extract a filtrate out of the lumen of the hollow fiber membranes 77. The hollow fiber membranes 77 are individually closed on top and are laterally enveloped by a continuous housing 80 which is configured as a rectangular tube with identical cross-sectional dimensions as the lateral wall 66 and that adjoins the lateral wall 66 on top. Below the base element 78 the membrane filter 64 includes a gas distributor 82 wherein the gas flow out channel 73 leads into the gas distributor 82. The gas introduction device 63 includes a liquid flow channel 83 that vertically penetrates the gas collection cavity 65 and the upper wall 68 in order to let a liquid flow into the bottom of the membrane filter 63. The combination of gas introduction device 63 and membrane filter 64 jointly forms a filtering device 84.

REFERENCE NUMERALS AND DESIGNATIONS 1 gas
2 liquid
3 gas introduction device
4 surface
5 level
6 gas volume
7 gas collection cavity
8 upper wall
9 side wall
10 gas inlet
11 deflection portion
12 inlet cross section
13 gas flow out channel
14 gas lifting channel
15 compensation channel
16 gas lifting inlet
17 compensation inlet
18 blocking flow
19 gas introduction device
20 lateral wall
21 compensation inlet
22 upper wall
23 gas collection cavity
24 inlet cross section
25 gas lifting channel
26 gas introduction device 27 gas introduction device
28 gas introduction device
29 gas flow out channel
30 gas lifting channel
31 lateral wall
32 gas lifting inlet
33 compensation inlet
34 gas collection cavity
35 compensation channel
36 gas inlet
37 gas inlet
38 gas inlet
39 upper wall
40 side wall
41 gas introduction device
42 gas flow out channel
43 inlet cross section
44 gas collection cavity
45 deflection portion
46 gas lifting channel
47 side wall
48 compensation inlet
49 compensation channel
50 gas introduction device
51 gas collection cavity
52 lateral wall
53 gas outflow channel
54 upper wall
55 inlet cross section
56 deflection portion
57 gas lifting channel
58 outer wall
59 bell
60 gas lifting inlet
61 compensation channel
62 compensation inlet
63 gas introduction device
64 membrane filter
65 gas collection cavity
66 side wall
67 gas inlet
68 upper wall
69 gas lifting inlet
70 gas lifting channel
71 deflection portion
72 inlet cross section
73 gas outlet channel
74 compensation channel
75 compensation inlet
76 membrane
77 hollow filter membrane
78 base element
79 permeate collection cavity
80 continuous tubular housing
82 gas distributor
83 liquid flow channel
84 filter device

What is claimed is:

1. A method for introducing a gas into a liquid, the method comprising:
 filling a gas volume enclosed below a free surface of the liquid and defined in a downward direction by an enclosed level of the liquid with the gas in sequential pulses wherein the gas simultaneously displaces the enclosed level of the liquid top down in a gas lifting channel until the enclosed level of the liquid drops below an inlet cross section of a gas flow out channel; subsequently
 flowing the gas out of the gas volume downward through the gas lifting channel, a deflection portion connected at a bottom of the gas lifting channel and closed at a bottom side, from the deflection portion in an upward direction through the inlet cross section and through the gas flow out channel connected to the inlet cross section at a top of the inlet cross section to the free surface of the liquid, wherein a blocking flow of the liquid flows downward through a compensation inlet that is arranged below a gas lifting channel inlet and above the inlet cross section into a compensation channel that is separated from the gas lifting channel by a compensation channel wall that extends between the compensation inlet and the inlet cross section so that the liquid flows into the inlet cross section and is moved along by the gas until the liquid fills the downward closed deflection portion and thereby closes the inlet cross section;
 initially only flowing the gas through the gas flow out channel after the enclosed level of the liquid has dropped below the inlet cross section until the enclosed level of the liquid rises above the compensation inlet; and only thereafter
 running the blocking flow downward through the compensation inlet to the inlet cross section.

2. A method for filtering a liquid in a membrane filter submerged in the liquid, the membrane filter including membranes, the method comprising:
 flowing the gas through the gas flow out channel according to the method according to claim 1; and subsequently
 introducing the gas into the membrane filter from below for cleaning the membranes.

3. A gas introduction device, comprising:
 a downward open gas collection cavity, defined by an upper wall and a lateral wall;
 a gas inlet configured to let a gas into the downward open gas collection cavity;
 an upward open and downward closed gas lifting channel configured to lift the gas out of the downward open gas collection cavity and empty the downward open gas collection cavity, wherein the upward open and downward closed gas lifting channel includes a gas lifting channel inlet arranged at a top of the upward open and downward closed gas lifting channel in at a top portion of the gas collection cavity;
 a downward closed deflection portion connected at a bottom of the upward open and downward closed gas lifting channel;
 an inlet cross section arranged at a top of the deflection portion wherein a gas outlet channel is connected at the top of the deflection portion;
 a compensation inlet separate from the gas lifting channel inlet and arranged below the gas lifting channel inlet and open towards the inlet cross section; and
 a compensation channel that is separated from the gas lifting channel by a compensation channel wall that extends between the compensation inlet and to the inlet cross section,
 wherein the compensation inlet is arranged above the inlet cross section.

4. The gas introduction device according to claim 3, wherein the compensation inlet is arranged at the upward open and downward closed gas lifting channel.

5. The gas introduction device according to claim 3, wherein the compensation channel adjoins the compensation inlet in a direction towards the downward closed deflection portion.

6. The gas introduction device according to claim 5, wherein the compensation channel leads into the upward open and downward closed gas lifting channel.

7. The gas introduction device according to claim 5, characterized in that the compensation channel runs parallel to the upward open and downward closed gas lifting channel and leads into the downward closed deflection portion.

8. The gas introduction device according to claim 5, wherein a cross section of the compensation inlet is greater than a minimum cross section of the compensation channel.

9. A filter device, comprising:
a membrane filter configured to filter a liquid and including membranes and a gas introduction device arranged below the membranes and configured to introduce a gas into the membrane filter,
wherein the gas introduction device is configured according to claim 3.

10. The filter device according to claim 9, further comprising:
a housing that laterally envelops the membranes and adjoins the gas introduction device on top,
wherein the gas introduction device includes a liquid flow channel that vertically penetrates the gas collection cavity and that is configured to let the liquid flow into the membrane filter at a bottom of the membrane filter.

11. The filter device according to claim 10, wherein the housing is a configured as a continuous tube.

12. The filter device according to claim 9, further comprising:
a gas distributor arranged below the membranes,
wherein the gas flow out channel leads into the gas distributor.

* * * * *